US009736520B2

United States Patent
Chen et al.

(10) Patent No.: US 9,736,520 B2
(45) Date of Patent: Aug. 15, 2017

(54) SYSTEM AND METHOD FOR ORGANIZING MULTIMEDIA CONTENT

(71) Applicant: Futurewei Technologies, Inc., Plano, TX (US)

(72) Inventors: Yue Chen, Fremont, CA (US); Hong Heather Yu, West Windsor, NJ (US); Hongbing Li, Skillman, NJ (US); Jianbin Dai, Sunnyvale, CA (US); Zhenhua Liu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 29 days.

(21) Appl. No.: 13/757,614

(22) Filed: Feb. 1, 2013

(65) Prior Publication Data
US 2013/0198783 A1  Aug. 1, 2013

Related U.S. Application Data

(60) Provisional application No. 61/593,728, filed on Feb. 1, 2012.

(51) Int. Cl.
| | |
|---|---|
| *H04N 5/445* | (2011.01) |
| *H04N 21/27* | (2011.01) |
| *H04N 21/8541* | (2011.01) |
| *H04N 21/845* | (2011.01) |
| *H04N 21/235* | (2011.01) |
| *G06F 17/30* | (2006.01) |

(52) U.S. Cl.
CPC ....... *H04N 21/27* (2013.01); *G06F 17/30858* (2013.01); *H04N 21/2353* (2013.01); *H04N 21/845* (2013.01); *H04N 21/8541* (2013.01)

(58) Field of Classification Search
CPC .......................... H04N 21/845; H04N 21/8541
USPC ....................................................... 725/53, 39
See application file for complete search history.

(56) References Cited

U.S. PATENT DOCUMENTS

| 5,835,667 A | 11/1998 | Wactlar et al. |
| 6,122,628 A | 9/2000 | Castelli et al. |
| (Continued) | | |

OTHER PUBLICATIONS

Notification of Transmittal of the International Search Report and the Written Opinion of the International Searching Authority, or the Declaration for Application No. PCT/US2013/024507, Mailed Jun. 10, 2013, 11 pages.

(Continued)

*Primary Examiner* — Pankaj Kumar
*Assistant Examiner* — Franklin Andramuno
(74) *Attorney, Agent, or Firm* — Slater Matsil, LLP

(57) ABSTRACT

In one embodiment, a method of organizing multimedia content includes obtaining, by a server, a first video program. Also, the method includes selecting a first video, where the first video is a first subset of the first video program, and where the first video forms a first branch of the first video program and selecting a second video, where the second video is a second subset of the first video program. Additionally, the method includes selecting a first partial video, where the first partial video is a first subset of the first video and selecting a second partial video, where the second partial video is a second subset of the first video. The method also includes establishing a multi-dimensional index tree including a first video program level, a first video level, a first partial video level.

24 Claims, 8 Drawing Sheets

(56) References Cited

U.S. PATENT DOCUMENTS

| | | |
|---|---|---|
| 6,278,446 B1 | 8/2001 | Liou et al. |
| 6,859,455 B1 | 2/2005 | Yazdani et al. |
| 2008/0052739 A1 | 2/2008 | Logan |
| 2008/0133464 A1 | 6/2008 | Shin |
| 2009/0132918 A1 | 5/2009 | Deyo et al. |
| 2012/0011544 A1* | 1/2012 | Vaysman et al. ............... 725/38 |
| 2012/0163770 A1* | 6/2012 | Kaiser et al. ................. 386/241 |

OTHER PUBLICATIONS

Das, M., et al., "A New Hybrid Approach to Video Organization for Content-Based Indexing," IEEE ICMCS, Jun. 28, 1998 to Jul. 1, 1998, 10 pages.

Kuchinsky, A., et al., "FotoFile: A Consumer Multimedia Organization and Retrieval System," Proceedings of the SIGCHI conference on Human factors in computing systems, May 1999, 8 pages.

* cited by examiner

SYSTEM AND METHOD FOR ORGANIZING MULTIMEDIA CONTENT

This application claims the benefit of U.S. Provisional Application No. 61/593,728 filed on Feb. 1, 2012, entitled "System and Method for Multimedia Content Storage in Media Cloud) which application is hereby incorporated herein by reference.

TECHNICAL FIELD

The present invention relates to a system and method for organizing media, and, in particular, to a system and method for organizing multimedia content.

BACKGROUND

Video is an important part of people's digital life, with a strong impact on entertainment, enterprise solutions, education, and medical services. The amount of internet video is growing at an astonishing rate. In 2011, 82.5% of the U.S. internet audience viewed a video online, with an average 816.4 minutes of video viewing per user. By 2013, it is estimated that 90% of internet traffic will be video. Video may be continuously streamed to users in real time. For example, a video of a sporting event may be streamed live.

Cloud computing may be used to distribute video content over the internet. Cloud computing involves the use of hardware and software to deliver content as a service over a network, such as the internet. The content is stored on the cloud, not on user equipment. Cloud computing allows for the delivery of multimedia content with agility, reliability, scalability, security, a high performance, and a low cost. Cloud content may be available on demand.

SUMMARY

An embodiment method of organizing multimedia content includes obtaining, by a server, a first video program. Also, the method includes selecting a first video, where the first video is a first subset of the first video program, and where the first video forms a first branch of the first video program and selecting a second video, where the second video is a second subset of the first video program, and where the second video forms a second branch of the first video program. Additionally, the method includes selecting a first partial video, where the first partial video is a first subset of the first video, and where the first partial video forms a first branch of the first video and selecting a second partial video, where the second partial video is a second subset of the first video, and where the second partial video forms a second branch of the first video. The method also includes establishing a multi-dimensional index tree including a first video program level for the first video program, a first video level for the first video and the second video, a first partial video level for the first partial video and the second partial video.

An embodiment method of searching a tree index includes receiving, by a server, a first search phrase. Also, the method includes determining if the first search phrase matches metadata in a program index and indicating a program match if the first search phrase matches metadata in the program index. Additionally, the method includes determining if the first search phrase matches metadata in a video index, where the video index forms a branch of the program index and indicating a video match if the first search phrase matches metadata in the video index.

An embodiment method of adding an input video to a tree index includes receiving, by a server, the input video and extracting features of the input video. Also, the method includes comparing the extracted features of the input video with metadata in a metadata database and incorporating the input video into a matched video corresponding to metadata that matches the extracted features of the input video when the extracted features of the input video match metadata in the metadata database.

An embodiment server includes a processor and a computer readable storage medium storing programming for execution by the processor. The programming includes instructions to receive a first search phrase. Also, the programming includes instructions to determine if the first search phrase matches metadata in a program index and indicate a program match if the first search phrase matches metadata in the program index. Additionally, the programming includes instructions to determine if the first search phrase matches metadata in a video index, where the video index forms a branch of the program index and indicate a video match if the first search phrase matches metadata in the video index.

Another embodiment server includes a processor and a computer readable storage medium storing programming for execution by the processor. The programming includes instructions to obtain a first video program. Also, the programming includes instructions to select a first video, where the first video is a first subset of the first video program, and where the first video forms a first branch of the first video program and select a second video, where the second video is a second subset of the first video program, and where the second video forms a second branch of the first video program. Additionally, the programming includes instructions to select a first partial video, where the first partial video is a third subset of the first video, and where the first partial video forms a third branch of the first video and select a second partial video, where the second partial video is a fourth subset of the first video, and where the second partial video forms a fourth branch of the first video. The programming also includes instructions to establish a multi-dimensional index tree including a video program level for the first video program, a video level for the first video and the second video, a partial video index for the first partial video and the second partial video.

An additional embodiment server includes a processor and a computer readable storage medium storing programming for execution by the processor. The programming includes instructions to receive an input video and extract features of the input video. Also, the programming includes instructions to compare the extracted features of the input video with metadata in a metadata database and incorporate the input video into a matched video corresponding to metadata that matches the extracted features of the input video when the extracted features of the input video match metadata in the metadata database.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
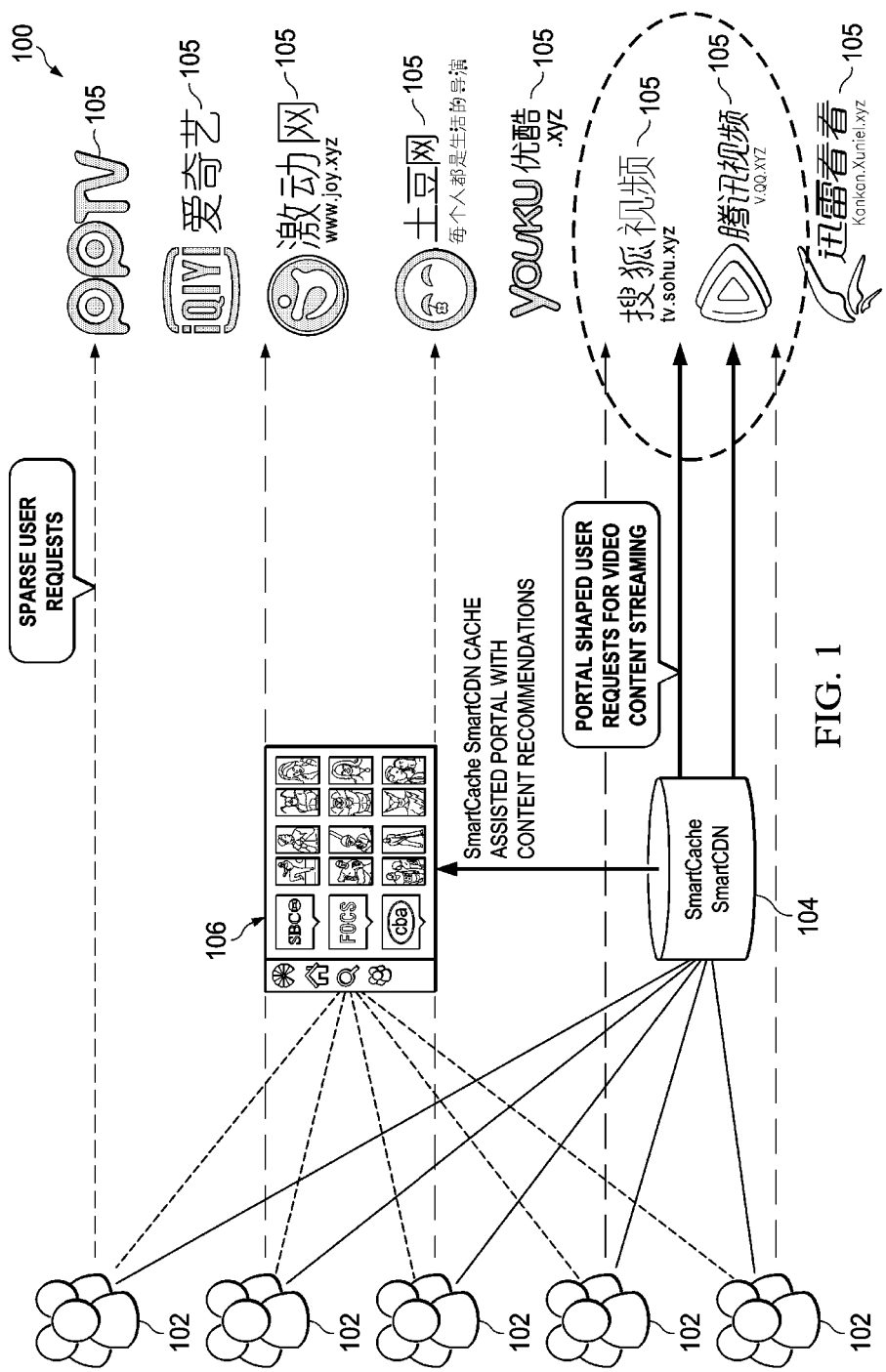
FIG. 1 illustrates an embodiment smart content delivery network.

FIG. 1 illustrates a smart content delivery network (CDN) 100 configured to organize multimedia content, such as digital videos. The content may reside on clouds 102. Smart CDN 104 or smart cache assists portal 106 with content organization. Using smart CDN 104 or smart cache, users may find videos through a single portal. Users 105 then receive the video content. Smart CDN 100 is a cache assisted multimodality shaped content organization and recommendation scheme.

Figure 2:
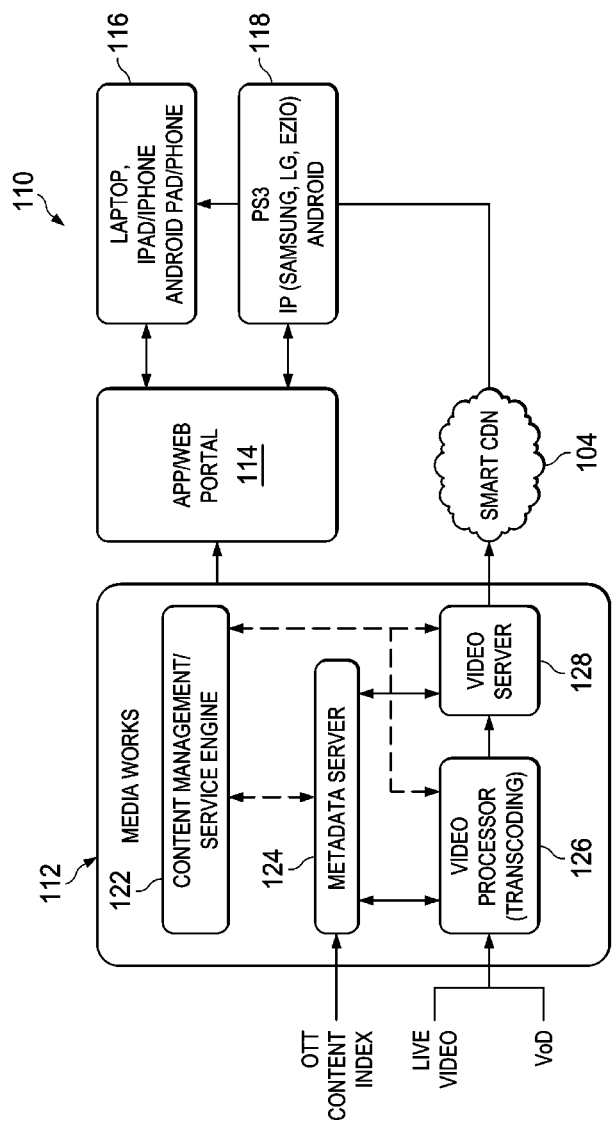
FIG. 2 illustrates an embodiment system for organizing multimedia content.

FIG. 2 illustrates system 110 for organizing multimedia content. System 110 includes media works 112, which is connected to application (App) or web portal 114 and smart CDN 104. Additionally, station 116, which may be a laptop, a tablet, or a smart phone, is connected to application or web portal 114 and to smart CDN 104. Also, station 118 is connected to application or web portal 114. Media works 112 contains content manager 122, metadata server 124, video processor 126, and video server 128. In an example, metadata server 124 receives over the top (OTT) content index. Metadata server 124 communicates with content manager 122, which manages content, video processor 126, and video server 128. Also, video processor 126 receives live video and video on demand (VoD), which video processor 126 transcodes and passes on to video server 128. Additionally, video server 128 communicates with content manager 122, video processor 126, and smart CDN 104. In an example, the video content is accessed or searched through web portal 114 and delivered through smart CDN 104 to various screens in various formats that are suitable for the terminal and network conditions.

Figure 3:
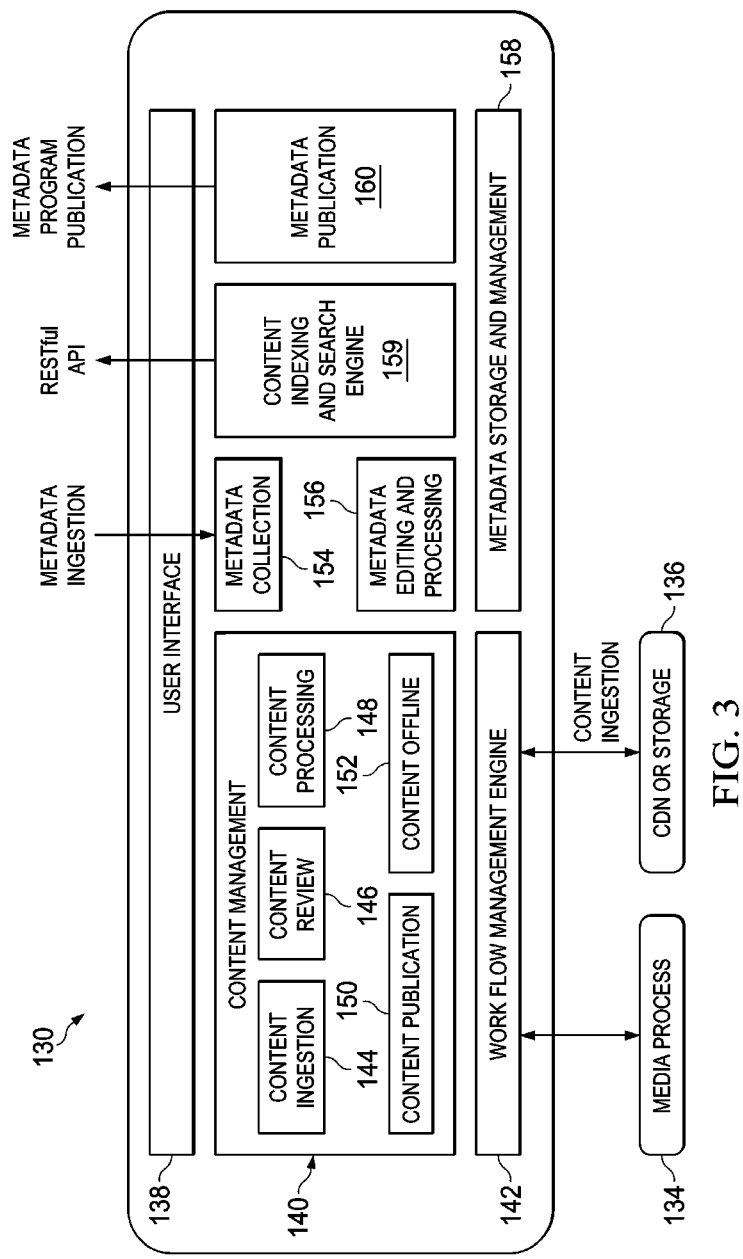
FIG. 3 illustrates a content management system.

FIG. 3 illustrates embodiment content management system 130. Content management system 130 includes content management 140 and work flow manager engine, which communicates with media process 134 and storage 136. Content is ingested from storage 136, which also communicates with media process 134. Additionally, content management system 130 includes the work flow management engine 142, content manager 140, metadata storage and management module 158, metadata editing and processing module 156, metadata collector 154, content indexing and search engine 159, metadata publisher 160, and user interface 138. Also, content manager 140 includes content ingester 144, content reviewer 146, content processor 148, content publisher 150, and content offline module 152. The content indexing and search engine interacts with a representational state transfer (RESTful) application programming interface (API). Also, metadata publisher 160 interacts with metadata collector 154, and the metadata collector 154 receives metadata.

Figure 4:
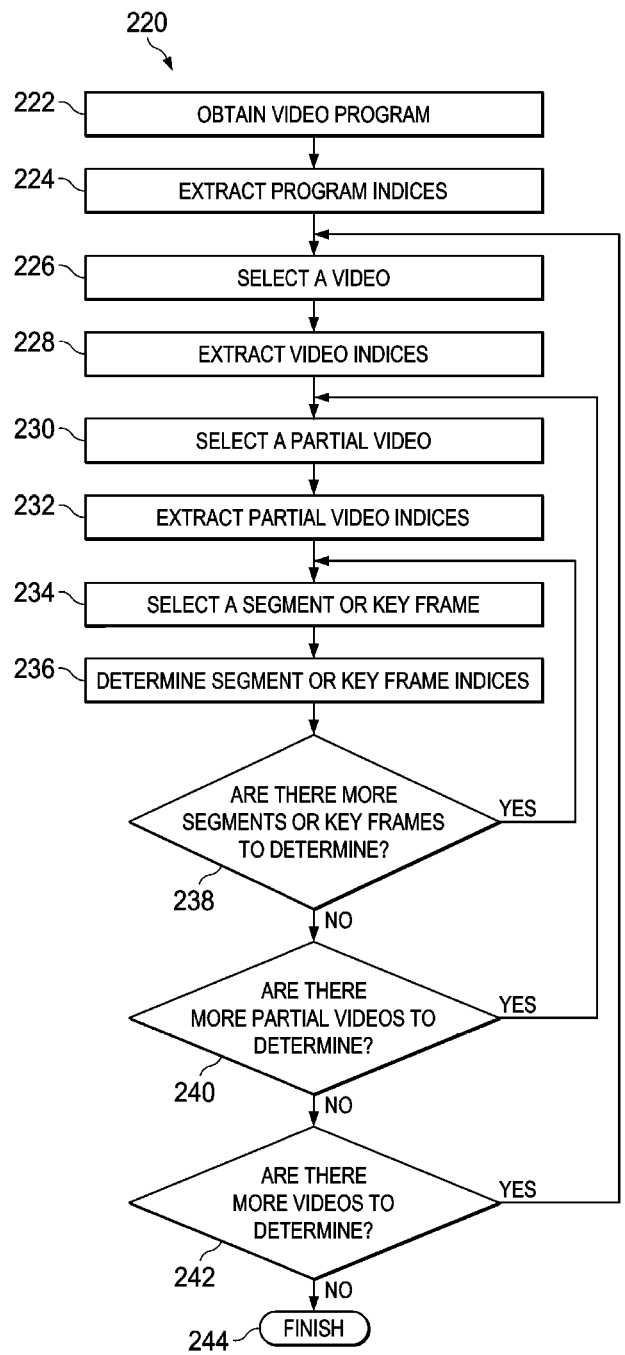
FIG. 4 illustrates a flowchart of an embodiment method of organizing multimedia content.

Multimedia content may be organized in a particular configuration. For example, an embodiment method organizes content in a tree index. FIG. 4 illustrates flowchart 220 for an embodiment method of adding video content to a tree index. Initially, in step 222, the system obtains a video program. In an embodiment, the video program is streamed video, for example a live streamed video of a sporting event. Alternatively, the video program may be video on demand. Indexing may be performed in real time as the video program is streamed. Next, in step 224, the system extracts a program level index of the programs. The program level index may contain textual information, video information, and audio information. Textual information may include global textual information such as title or description, or local textual information such as closed captioning. Video features may be extracted using an algorithm such as Scale-Invariant Feature Transfer (SIFT) or, Speeded Up Robust Features (SURF).

Next, in step 226, the system selects a video that is a subset of the video program. A video program may have multiple videos with different quality levels. For example, one high density (HD) video, one standard density (SD) video, and one video for smart phones. Then, in step 228, attributes of the video, such as video features, audio features, and textual features are extracted and added to a video level index. Next, in step 230, a partial video, which is a subset of the video, is selected. A partial video may be a scene where the video is a HD movie. A partial video may be from about a second to several minutes. After selecting a partial video, in step 232, partial video attributes, such as video features, audio features, and textual features, are extracted and added to a partial video index. In step 234, a segment or key frame, which is a subset of the partial video, is selected. A key frame is one event, for example a touchdown. In an example, the key frame is one frame of the partial video that is most representative. A key frame may be from about a single frame to about several seconds. A segment is a video segment that is a set period of time, such as two seconds. In an example, a segment is an arbitrary two second clip of the partial video. The system may index both segments and key frames, just segments, just key frames, or neither segments nor key frames. Next, in step 236, the system extracts features of the key frame or segment and adds the extracted features to a key frame segment level. The features may be video features, audio features, and/or textual features.

Then, in step 238, the system determines if it will search for more key frames or segments. For example, if the system is determining segments, it may index every two second segment in the partial video. In an example, only one key frame is extracted per partial video. If there are more key frames or segments, the system goes to step 234 to select another segment or key frame. However, if there will not be another key frame or segment in this partial video, the system goes to step 240, where it decides if there will be another partial video in the video. If there will be another partial videos in this video, the system goes to step 230, to select another partial video. However, if there will not be another partial video in this video, the system goes to step 242, where it determines if there will be more videos in this program. For adaptive streaming, a video program may have multiple different quality levels of videos. If there will be another video in the video program, the system goes to step 226, and it selects another video. However, if there will not be another video in this video program, the system goes to step 244, and finishes adding the video program to the tree index.

Figure 5:
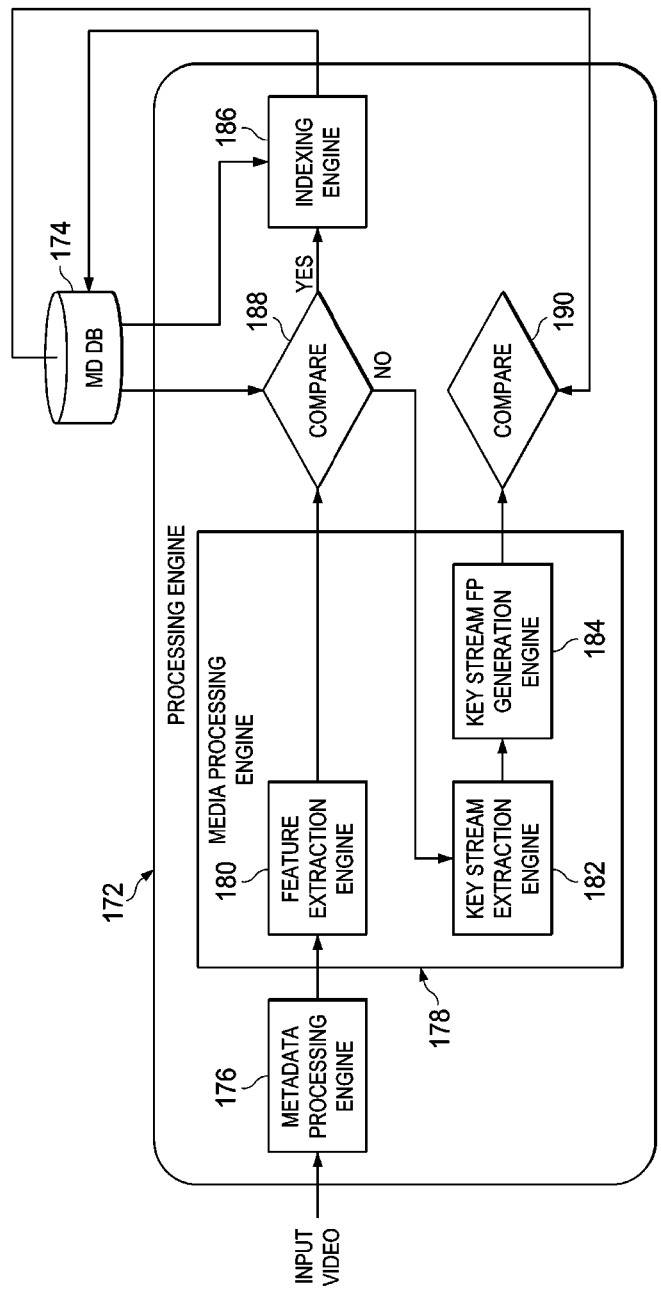
FIG. 5 illustrates an embodiment processing engine for organizing multimedia content.

FIG. 5 illustrates processing engine 172 and metadata (MD) database (DB) 174. Initially, an input video is processed by metadata processing engine 176 of processing engine 172 to extract metadata from the input video. The extracted metadata may be textual, audio, and/or video data metadata. Then, feature extraction engine 180 of media processing engine 178 extracts features from the input video. For example, a multimodality vector of the input video may be extracted that includes the title, duration, format, a plurality of audio fingerprints, and a plurality of video fingerprints. The plurality of audio fingerprints and the plurality of video fingerprints may each be arranged as a vector. Then, in comparison block 188, the multimodality vector is compared to metadata in metadata database 174. If the multimodality vector matches metadata in metadata database 174, the input video is classified as a new version of the matched video that corresponds to the metadata in metadata database 174. If there is a match, indexing engine 186 generates an indicator that depicts that the input video related to the matched video, extracts additional metadata from the input video, and incorporates the additional metadata from the input video with the metadata already in metadata database 174, and updates metadata database 174 with the new metadata.

If no match is found, the input video is sent to the key frame extraction engine 182, of media processing engine 178, where a plurality of key frames of the input video is extracted. Then, in key frame fingerprint generation engine 184 of media processing engine 178, a plurality of key frame fingerprints is generated, one for each key frame. In an example, video segmentation may be used to extract the head stream and the tail stream of the input video. Then, the key frame may be generated from the tail stream and the head stream. Next, in comparison block 190, the plurality of key frame fingerprints is compared with key frame fingerprints stored in metadata database 174. If there is no match, a new index item is added to the index table. Once a match is found, indexing engine 186 generates additional metadata of the input video. Next, the input video may be stored in a video database (not pictured). In an example, the video database resides in the cache. In an embodiment, the key frame extraction utilizes modeling and fast video segmentation algorithms. Then, a tree index of the input video and its metadata are generated by indexing engine 186 if no match of the input video's metadata is found in the metadata database. The indexes may include a program level, video level, partial video level, and key frame segment level metadata. Global textual information, such as the title, header, and format, and local textual information, such as subtitles, visual information such as visual fingerprints and visual content information, and audio information such as audio fingerprinting and audio content are organized via a tree index.

Figure 6:
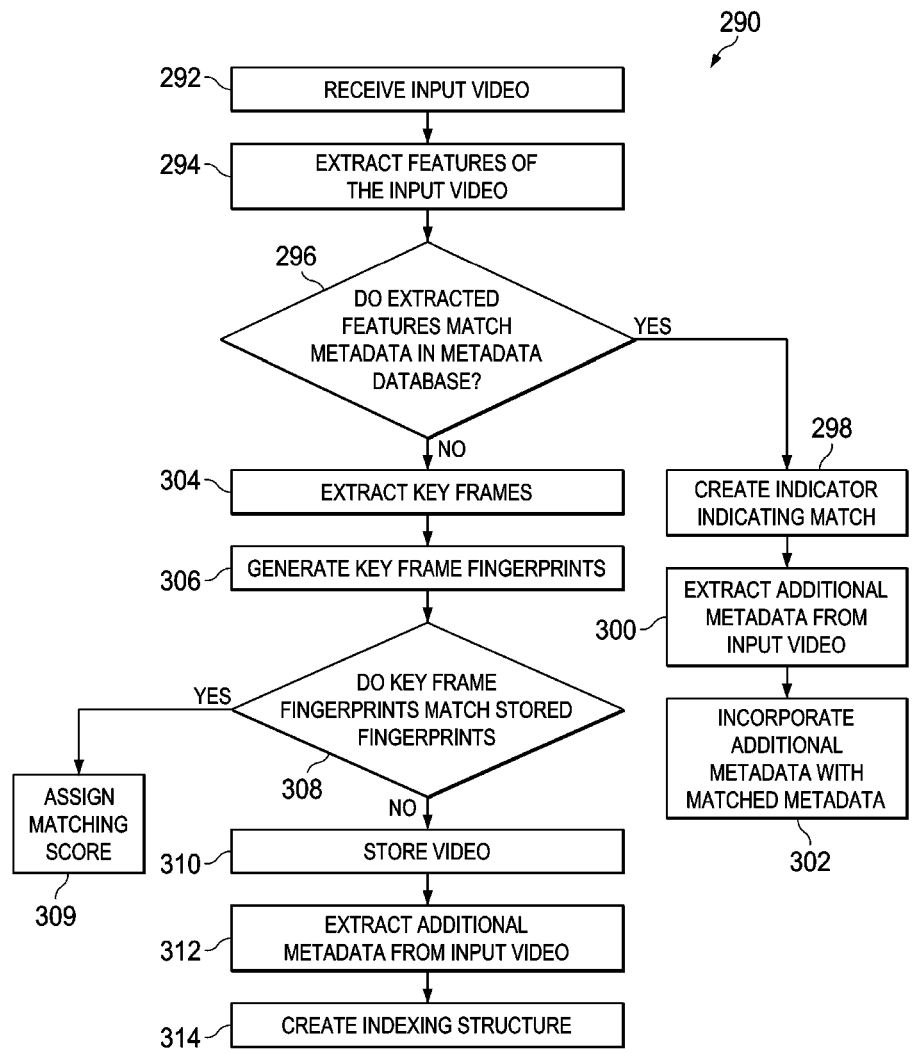
FIG. 6 illustrates an embodiment method of searching for an input video.

FIG. 6 illustrates flowchart 290 of an embodiment method of searching for an input video. Initially, in step 292, the system receives an input video. Then, in step 294, features of the video are extracted. For example, visual features, audio features, and textual information are extracted from the input video. Next, in step 296, it is determined if the extracted features match metadata in a metadata database. If the extracted features match metadata in the metadata database, the system progresses to step 298, where an indicator is created that indicates that the input video matches a matched video corresponding to the matched metadata. Then, in step 300, additional metadata is extracted from the input video, and, in step 302, the additional metadata is incorporated with the matched metadata. However, if the extracted features do not match metadata in the metadata database, key frames are extracted from the input video in step 304. Then, in step 306, key frame fingerprints are generated from the key frames and, in step 308, it is determined if the key frame fingerprints match metadata stored in the metadata database. If there is a match, in step 309, the match may be given a matching score. Eventually the system will return all matches based on the matching score ranking. If the key frame fingerprints do not match fingerprints in the metadata database, in step 310, the input video is stored in a video database. Next, in step 312, additional metadata is extracted from the input video, and in step 314, and a tree index is created, which may be used to organize multimedia content.

Figure 7:
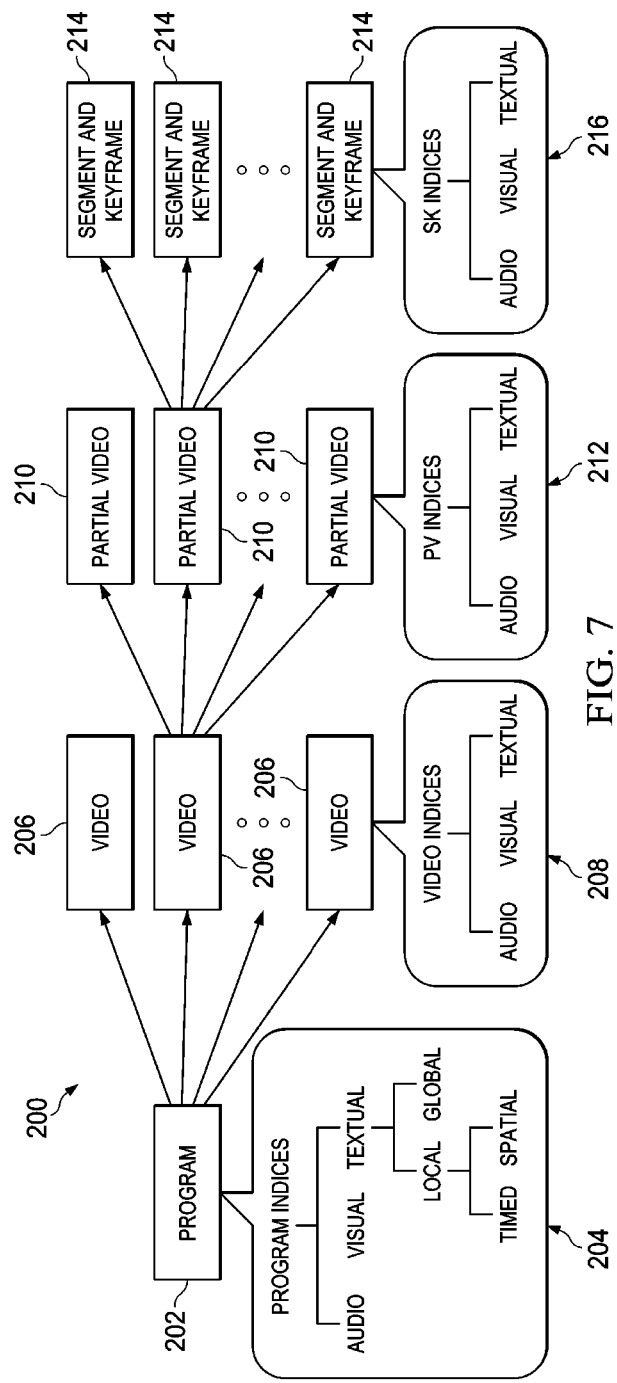
FIG. 7 illustrates an embodiment tree indexing structure for organizing multimedia content.

FIG. 7 illustrates tree index 200, which may be used to organize multimedia content. Tree index 200 is a tree index that has a tree structure. Tree index 200 has program level 202, video level 206, partial video level 210, and segment and key frame level 214. Program level 202 contains program index 204, which includes global textual information, local textual information, visual information, and audio information of a video program organized in an indexing system. Video level 206, which branches out from program level 202, contains video indexes 208, which contain video information audio information, and textual information of videos, which are subsets of the video program. Branching out from video level 206 is partial video level 210, contains partial video indexes 212, which contain audio metadata, video metadata, and textual metadata of partial video level 210, which are subsets of video level 206. Segment and key frame layer 214, which branches out from partial video level 210, includes segment and key frame indexes 216, which contains video metadata, audio metadata, and textual metadata of segments and key frames 214, which are subsets of partial video level 210.

Subsets of a video program are organized into a program family tree. Multiple versions of the same video or partial video of the same video are organized into the index tree with links to all versions and parts available for user access. A new video is processed by a processing engine. If the family of the new video, such as its ascendants, descendants, or siblings, is found in tree index 200, the new video is added to the family tree. If no ascendants, descendants, or siblings are found, a new family tree is created with the new video as the video program.

When a query is received by a portal of an IP video system, the query processing engine parses the query, generates a query search stream, and looks up in a metadata database to find a match. The family tree of each matching result is returned with the matching result. In an embodiment, a weighting function considers services rules and regulation and facilitates the control of searches and query retrieval.

Figure 8:
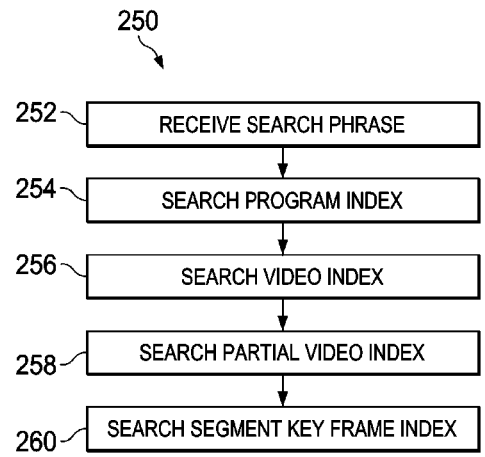
FIG. 8 illustrates an embodiment method of searching multimedia content.

FIG. 8 illustrates flowchart 250 for an embodiment method of searching a tree index. Initially, in step 252, a search phrase is received from a user. Next, in step 254, a programming index is search. A match at the program level will return all videos of different quality levels of this program. Then, in step 256, a video level index is searched. A video level match returns all partial videos within this video. A partial video may be identified with the start time and end time mark within the video. After searching the video level index, a partial video level index is searched in step 258. A partial video level match will indicate the correlated start time. Finally, a segment key frame index is searched in step 260. A match at the segment or key frame level will indicate the appropriate start time.

Figure 9:
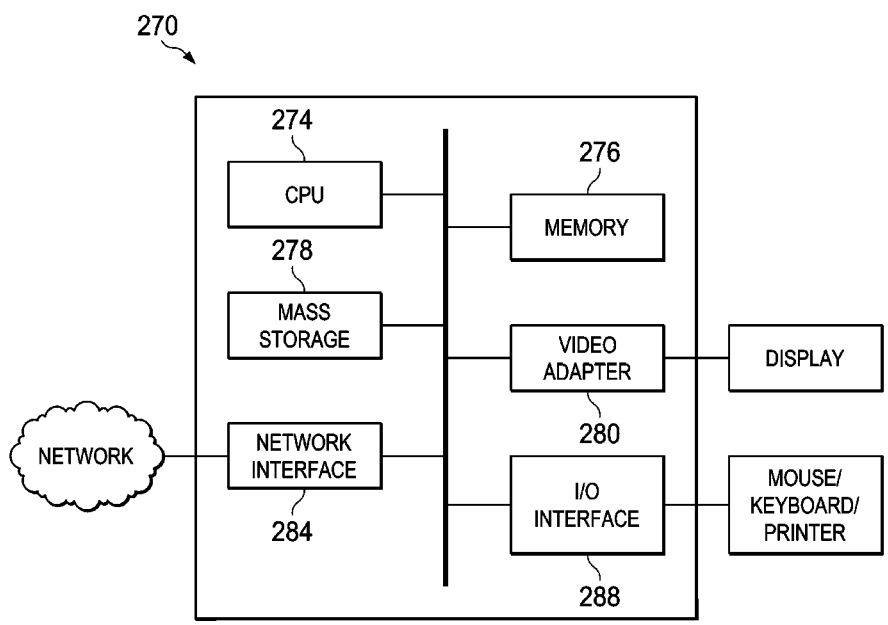
FIG. 9 illustrates a schematic diagram of an embodiment of a general-purpose computer system.

FIG. 9 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Advantages of an embodiment include a lightweight processing scheme for a scalable and flexible video organizer in a media cloud. An embodiment employs multiple modality-based video processing and organization schemes to offer quality of experience (QoE) enhanced video indexing, browsing, and searching. An example embodiment is implemented in IP video and media cloud applications, such as video management systems and video distribution systems. An embodiment includes multiple levels of indexes providing convenience and search capability. In an example, a tree based indexing scheme is scalable and easy to use. An embodiment includes better service control with multimodality based indexing.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of organizing multimedia content, the method comprising:
   receiving, by a server, a first video program;
   selecting, by the server, a first video, wherein the first video is a first portion of the first video program, and wherein the first video forms a first branch of the first video program;
   selecting, by the server, a second video, wherein the second video is a second portion of the first video program, and wherein the second video forms a second branch of the first video program;
   selecting, by the server, a first partial video, wherein the first partial video is a first portion in time of the first video, and wherein the first partial video forms a first branch of the first video;

selecting, by the server, a second partial video, wherein the second partial video is a second portion in time of the first video, and wherein the second partial video forms a second branch of the first video; and storing, by the server in a metadata database, a first multi-dimensional tree index including a first video program level comprising an electronic link to the first video program, a first video level comprising an electronic link to the first video and an electronic link to the second video, and a first partial video level comprising an electronic link the first partial video and an electronic link to the second partial video, wherein the first video program level of the first multi-dimensional tree index and the first video level of the first multi-dimensional tree index are related to the first video program.

2. The method of claim 1, further comprising determining a video program index in accordance with the first video program, wherein the first multi-dimensional tree index includes the video program index at the first video program level.

3. The method of claim 2, wherein determining the video program index comprises extracting video features from the first video program.

4. The method of claim 2, wherein determining the video program index comprises extracting audio features from the first video program.

5. The method of claim 2, wherein determining the video program index comprises extracting textual features from the first video program.

6. The method of claim 2, further comprising determining a video index in accordance with the first video and the second video, wherein the first multi-dimensional tree index further includes the video index at the first video level.

7. The method of claim 6, further comprising determining a partial video index in accordance with the first partial video and the second partial video, wherein the first multi-dimensional tree index further includes the partial video index at the first partial video level.

8. The method of claim 1, wherein the first video program comprises a live streamed video.

9. The method of claim 1, further comprising selecting a first key frame, wherein the first key frame is a first portion of the first partial video, wherein the first key frame forms a first branch of the first partial video, and wherein the first multi-dimensional tree index further includes a key frame level for the first key frame.

10. The method of claim 9, further comprising determining a key frame index in accordance with the first key frame, and wherein the first multi-dimensional tree index further includes the key frame index at the key frame level.

11. The method of claim 1, further comprising:
determining a first segment, wherein the first segment is a first portion of the first partial video, and wherein the first segment forms a first branch of the first partial video; and
determining a second segment, wherein the second segment is a second portion of the first partial video, wherein the second segment forms a second branch of the first partial video, and wherein the first multi-dimensional tree index further comprises a first segment level for the first segment and the second segment.

12. The method of claim 11, further comprising determining a segment index in accordance with the first segment and the second segment, wherein the first multi-dimensional tree index further includes the segment index at the first segment level.

13. The method of claim 1, further comprising:
receiving, by the server, a second video program;
determining a third video, wherein the third video is a first portion of the second video program, and wherein the third video forms a first branch of the second video program;
determining a fourth video, wherein the fourth video is a second portion of the second video program, and wherein the fourth video forms a second branch of the second video program;
determining a third partial video, wherein the third partial video is a first portion of the third video, and wherein the third partial video forms a first branch of the third video;
determining a fourth partial video, wherein the fourth partial video is a second portion of the third video, and wherein the fourth partial video forms a second branch of the third video;
storing a second tree index comprising a first indicator of the third video, a second indicator of the fourth video, a third indicator of the third partial video, and a fourth indicator of the fourth partial video; and
determining a second multi-dimensional tree index comprising a second video program level for the second video program, a second video level for the third video and the fourth video, and a second partial video level for the third partial video and the fourth partial video.

14. A server comprising:
a processor;
a metadata database; and
a non-transitory computer readable storage medium storing programming for execution by the processor, the programming including instructions to:
receive a first video program,
select a first video, wherein the first video is a first portion of the first video program, and wherein the first video forms a first branch of the first video program,
select a second video, wherein the second video is a second portion of the first video program, and wherein the second video forms a second branch of the first video program,
select a first partial video, wherein the first partial video is a first portion in time of the first video, and wherein the first partial video forms a first branch of the first video,
select a second partial video, wherein the second partial video is a second portion in time of the first video, and wherein the second partial video forms a second branch of the first video, and
store, in the metadata database, a multi-dimensional tree index including a video program level comprising an electronic link to the first video program, a video level comprising an electronic link to the first video and an electronic link to the second video, and a partial video index comprising an electronic link to the first partial video and an electronic link to the second partial video, wherein the video program level of the multi-dimensional tree index and the video level of the multi-dimensional tree index are related to the first video program.

15. The method of claim 1, further comprising:
receiving, by the server, a first search phrase;

determining whether the first search phrase matches metadata in a program index of the first multi-dimensional tree index;
indicating a program match when the first search phrase matches metadata in the program index;
determining whether the first search phrase matches metadata in a video index of the first multi-dimensional tree index, wherein the video index forms a branch of the program index; and
indicating a video match when the first search phrase matches metadata in the video index.

16. The method of claim 15, further comprising:
determining whether the first search phrase matches metadata in a partial video index of the first multi-dimensional tree index, wherein the partial video index forms a branch of the video index; and
indicating a partial video match whether the first search phrase matches metadata in the partial video index.

17. The method of claim 15, further comprising determining whether the first search phrase matches metadata in a segment key frame index of the first multi-dimensional tree index.

18. The method of claim 1, further comprising:
receiving, by the server, an input video;
extracting features of the input video to produce extracted features;
comparing the extracted features of the input video with metadata in the metadata database of the first multi-dimensional tree index; and
incorporating the input video into a matched video corresponding to metadata that matches the extracted features of the input video when the extracted features of the input video match metadata in the metadata database.

19. The method of claim 18, wherein incorporating the input video into the matched video comprises:
creating an indicator denoting that the input video matches the matched video;
extracting additional metadata from the input video; and
incorporating the additional metadata with the metadata in the metadata database that matches the extracted features.

20. The method of claim 18, further comprising:
extracting a plurality of key frames from the input video when the extracted features of the input video do not match metadata in the metadata database; and
generating a plurality of key frame fingerprints in accordance with the plurality of key frames.

21. The method of claim 20, wherein generating the plurality of key frame fingerprints comprises:
generating a plurality of head streams in accordance with the plurality of key frames; and
generating a plurality of tail streams in accordance with the plurality of key frames.

22. The method of claim 21, further comprising:
comparing the plurality of key frame fingerprints with key frame fingerprints in the metadata database;
generating additional metadata from the input video when one of the plurality of key frame fingerprints matches one of the key frame fingerprints in the metadata database; and
storing the input video.

23. The server of claim 14, wherein the programming further comprises instructions to:
receive a first search phrase;
determine whether the first search phrase matches metadata in a program index of the multi-dimensional tree index;
indicate a program match when the first search phrase matches metadata in the program index;
determine whether the first search phrase matches metadata in a video index of the multi-dimensional tree index, wherein the video index forms a branch of the program index; and
indicate a video match when the first search phrase matches metadata in the video index.

24. The server of claim 14, wherein the programming further comprises instructions to:
receive an input video;
extract features of the input video to produce extracted features;
compare the extracted features of the input video with metadata in the metadata database of the multi-dimensional tree index; and
incorporate the input video into a matched video corresponding to metadata that matches the extracted features of the input video when the extracted features of the input video match metadata in the metadata database.

* * * * *